United States Patent
Stern et al.

(10) Patent No.: US 10,171,964 B2
(45) Date of Patent: *Jan. 1, 2019

(54) LOCATION-ORIENTED SERVICES

(71) Applicant: International Business Machines Corporation, Armonk, NY (US)

(72) Inventors: Edith H. Stern, Yorktown Heights, NY (US); Patrick J. O'Sullivan, Ballsbridge (IE); Robert C. Weir, Dover, NH (US); Barry E. Willner, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/056,548

(22) Filed: Aug. 7, 2018

(65) Prior Publication Data

US 2018/0343549 A1    Nov. 29, 2018

Related U.S. Application Data

(63) Continuation of application No. 15/332,648, filed on Oct. 24, 2016, now Pat. No. 10,051,445, and a continuation of application No. 12/428,624, filed on Apr. 23, 2009, now Pat. No. 9,479,895.

(51) Int. Cl.
   *H04W 4/18*   (2009.01)
   *H04W 4/02*   (2018.01)
   *H04W 64/00*  (2009.01)

(52) U.S. Cl.
   CPC ............. *H04W 4/18* (2013.01); *H04W 4/02* (2013.01); *H04W 4/023* (2013.01); *H04W 64/00* (2013.01)

(58) Field of Classification Search
   CPC ......... H04W 4/02; H04W 4/023; H04W 4/18; H04W 64/00
   USPC ............ 455/456.1–457, 404.2, 414.1–414.2, 455/418–420; 340/539.13, 988–996; 701/468–491; 342/450–465
   See application file for complete search history.

(56) References Cited

U.S. PATENT DOCUMENTS

| | | | |
|---|---|---|---|
| 8,024,186 B1 * | 9/2011 | De Bonet | ........ H04N 21/25841 704/238 |
| 9,479,895 B2 | 10/2016 | Stern et al. | |
| 10,051,445 B2 | 8/2018 | Stern et al. | |
| 2002/0077130 A1 | 6/2002 | Owensby | |
| 2004/0192351 A1 | 9/2004 | Duncan | |

(Continued)

OTHER PUBLICATIONS

U.S. Appl. No. 12/428,624, Non-Final Office Action, dated Apr. 11, 2011, 17 pg.

(Continued)

*Primary Examiner* — Michael Y Mapa
(74) *Attorney, Agent, or Firm* — Cuenot, Forsythe & Kim, LLC (57) ABSTRACT

A location of a first mobile device associated with a first user is determined, and a location of a second mobile device associated with a second user is determined. A relationship between the first user and the second user is determined, and a proximity of the first mobile device relative to the second mobile device is determined. A location-oriented data service is provided to at least one of the first mobile device and the second mobile device.

18 Claims, 2 Drawing Sheets

(56) References Cited

U.S. PATENT DOCUMENTS

| | | | |
|---|---|---|---|
| 2005/0080665 A1 | 4/2005 | Bowman-Amuah | |
| 2005/0093768 A1* | 5/2005 | Devos | G06F 3/1446 345/1.3 |
| 2006/0031118 A1 | 2/2006 | Morris | |
| 2007/0060358 A1 | 3/2007 | Amaitis et al. | |
| 2007/0101365 A1 | 5/2007 | Clark et al. | |
| 2007/0271328 A1 | 11/2007 | Geelan et al. | |
| 2008/0165895 A1 | 7/2008 | Lesser et al. | |
| 2008/0186165 A1* | 8/2008 | Bertagna | G08B 21/0227 340/539.13 |
| 2009/0029721 A1 | 1/2009 | Doraswamy | |
| 2010/0053164 A1* | 3/2010 | Imai | G06F 3/011 345/427 |
| 2010/0138780 A1* | 6/2010 | Marano | G06F 3/1415 715/804 |
| 2010/0205242 A1* | 8/2010 | Marchioro, II | G06Q 10/10 709/203 |
| 2010/0240417 A1* | 9/2010 | Wickman | H04W 52/027 455/566 |
| 2010/0273459 A1 | 10/2010 | Stern et al. | |
| 2017/0041770 A1 | 2/2017 | Stern et al. | |

OTHER PUBLICATIONS

U.S. Appl. No. 12/428,624, Final Office Action, dated Jun. 30, 2011, 29 pg.

U.S. Appl. No. 12/428,624, Non-Final Office Action, dated Apr. 11, 2013, 23 pg.

U.S. Appl. No. 12/428,624, Final Office Action, dated Jul. 19, 2013, 31 pg.

U.S. Appl. No. 12/428,624, Examiner's Answer, dated Jan. 28, 2014, 19 pg.

U.S. Appl. No. 12/428,624, Decision on Appeal, dated Mar. 21, 2016, 12 pg.

U.S. Appl. No. 12/428,624, Notice of Allowance, dated Jul. 6, 2016, 15 pg.

U.S. Appl. No. 15/332,648, Non-Final Office Action, dated Jan. 26, 2017, 21 pg.

U.S. Appl. No. 15/332,648, Final Office Action, dated Jul. 25, 2017, 33 pg.

U.S. Appl. No. 15/332,648, Notice of Allowance, dated Apr. 11, 2018, 14 pg.

* cited by examiner

LOCATION-ORIENTED SERVICES

BACKGROUND OF THE INVENTION

This disclosure relates to mobile communications and information systems, and more particularly to mobile communications and information systems for providing location-oriented services.

In the present electronic and mobile or wireless communication age, location-oriented services have become prevalent as it has become possible to determine an individual's location with a fair amount of accuracy. Current location-oriented services utilize the ability to determine the location of a mobile device, such as a cellular telephone, smart phone, or the like, to provide location-based services, such as directions to a selected location, maps, and the like. These services, however, generally implement a service-to-individual user relationship. Further, the extent of the location-based services which may be provided are often constrained by the individual user environment, as well as by the limitations of the user's mobile device.

BRIEF SUMMARY OF THE INVENTION

In a first implementation, a method includes determining a location of a first mobile device associated with a first user. A location of a second mobile device associated with a second user may be determined. A relationship between the first user and the second user may be determined. A proximity of the first mobile device relative to the second mobile device may be determined. A location-oriented data service may be provided to at least one of the first mobile device and the second mobile device.

According to another implementation, a computer program product resides on a computer readable medium, having a plurality of instructions stored on it. When executed by a processor, the instructions cause the processor to perform operations including determining a location of a first mobile device associated with a first user. The instructions further cause the processor to determine a location of a second mobile device associated with a second user. The instructions further cause the processor to determine a relationship between the first user and the second user. The instructions further cause the processor to determine a proximity of the first mobile device relative to the second mobile device. The instructions further cause the processor to provide a location-oriented data service to at least one of the first mobile device and the second mobile device.

According to another implementation, a computing system includes a processor, and a memory module coupled with the processor. The processor and memory module are configured to determine a location of a first mobile device associated with a first user, and to determine a location of a second mobile device associated with a second user. The processor and memory module are also configured to determine a relationship between the first user and the second user, and determine a proximity of the first mobile device relative to the second mobile device. The processor and memory module are also configured to provide a location-oriented data service to at least one of the first mobile device and the second mobile device.

The details of one or more implementations are set forth in the accompanying drawings and the description below. Other features and advantages will become apparent from the description, the drawings, and the claims.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer-readable (i.e., computer-usable) medium(s) having computer-usable program code embodied thereon.

Any combination of one or more computer-readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, a device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-readable storage medium could even be paper or another suitable medium upon which a program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable storage medium may be any medium that can contain, or store a program for use by or in connection with an instruction execution system, apparatus, or device.

A computer readable signal medium may include a propagated data signal with computer-usable program code embodied therein, for example, in baseband or as part of a carrier wave. Such a propagated signal may take any of a variety of forms, including, but not limited to, electro-magnetic, optical, or any suitable combination thereof, A computer readable signal medium may be any computer-readable medium that can contain, store, communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
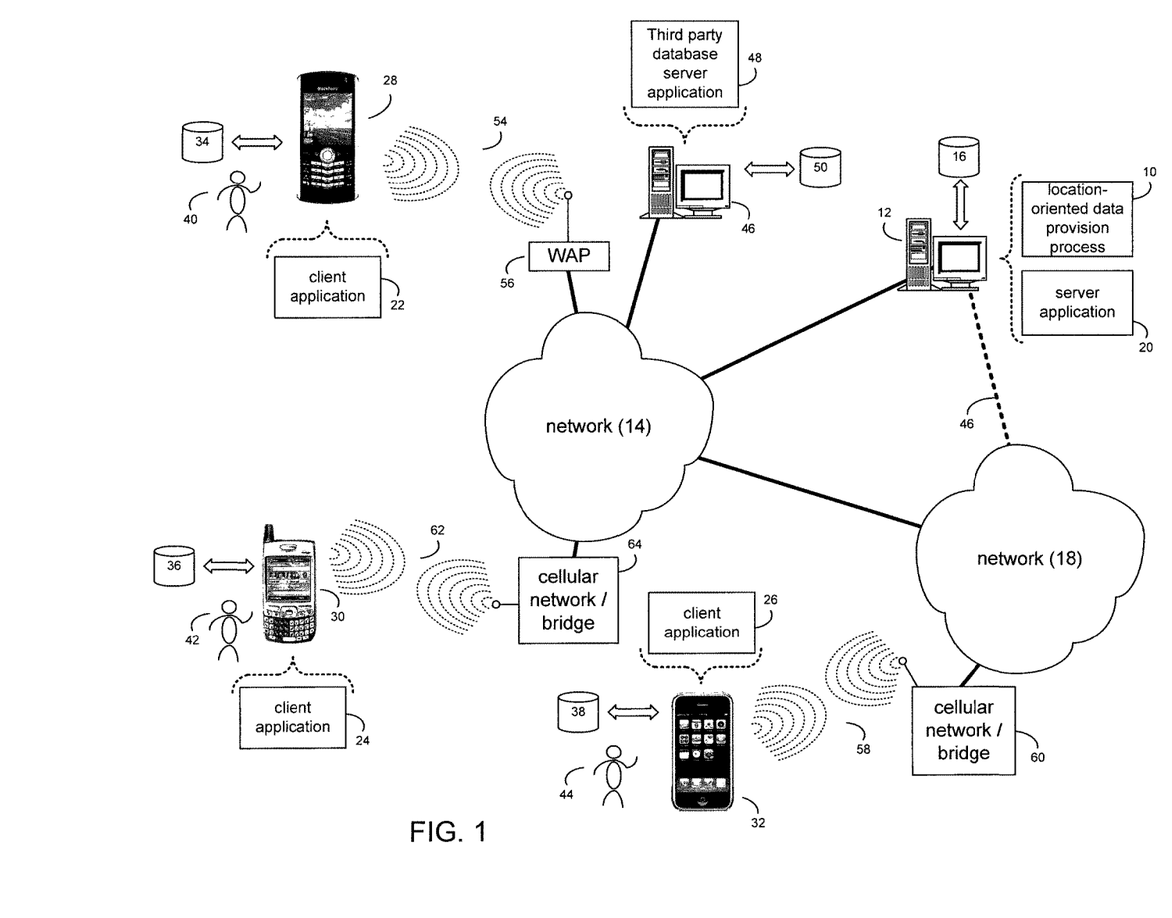
FIG. 1 diagrammatically depicts a location-oriented data provision process and a relationship application coupled to a distributed computing network.

Referring to FIG. 1, there is shown location-oriented data provision process 10 that may reside on and may be executed by server computer 12, which may be connected to network 14 (e.g., the Internet or a local area network). Examples of server computer 12 may be a web server (or a series of servers) running a network operating system, examples of which may include but are not limited to: Microsoft® Windows® XP Server; Novell® Netware®; or Red Hat® Linux®, for example (Microsoft and Windows are registered trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both). In addition/as an alternative, location-oriented data provision process 10 may reside on and may be executed by one or more client electronic devices, such as a mobile telephone, a personal digital assistant, and a data enabled cellular phone, for example.

As will be discussed in greater detail below, location-oriented data provision process 10 may determine a location of a first mobile device associated with a first user, and may determine a location of a second mobile device associated with a second user. A relationship between the first user and the second user may be determined. Further, a proximity of the first mobile device relative to the second mobile device may also be determined. Location-oriented data provision process 10 may provide a location-oriented data service to at least one of the first mobile device and the second mobile device.

The instruction sets and subroutines of location-oriented data provision process 10, which may include one or more software modules, and which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14. (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute one or more server applications (e.g., server application 20), examples of which may include but are not limited to a wireless data server application. Server application 20 may interact with client applications 22, 24, 26, e.g., allowing data services to be received by mobile devices 28, 30, 32. Client applications 22, 24, 26 may include, for example, a mobile web browser (e.g., Microsoft Internet Explorer® Mobile, Apple® Safari® Mobile, Opera® Mobile). Internet Explorer is a registered trademark of Microsoft Corporation in the United Stated, other countries, or both; both Apple and Safari are registered trademarks of Apple Inc.; Opera is a registered trademark of Opera Software ASA in the United States, other countries, or both. Location-oriented data provision process 10 may be a stand-alone application that interfaces with server application 20 or may be an applet/application that is executed within server application 20.

The instruction sets and subroutines of server application 20, which may be stored on storage device 16 coupled to server computer 12, may be executed by one or more processors (not shown) and one or more memory architectures (not shown) incorporated into server computer 12.

As mentioned above, in addition/as an alternative to being a server-side application residing on server computer 12, the location-oriented data provision process may be a client-side application (not shown) residing on one or more mobile device 28, 30, 32 (e.g., stored on storage devices 34, 36, 38, respectively). As such, the client-side location-oriented data provision process may be a stand-alone application that interfaces with a client application (e.g., client applications 22, 24, 26), or may be an applet/application that is executed within a client application (e.g., client applications 22, 24, 26). As such, the location-oriented data provision process may be a client-side process, a server-side process, or a hybrid client-side/server-side process, which may be executed, in whole or in part, by server computer 12, or one or more of client electronic devices 28, 30, 32.

The instruction sets and subroutines of client applications 22, 24, 26, which may be stored on storage devices 34, 36, 38 (respectively) coupled to mobile devices 28, 30, 32 (respectively), may be executed by one or more processors (not shown) and one or more memory architectures (not shown) incorporated into mobile devices 28, 30, 32 (respectively). Storage devices 34, 36, 38 may include but are not limited to: hard disk drives; solid state drives; tape drives; optical drives; RAID arrays; random access memories (RAM); read-only memories (ROM), compact flash (CF) storage devices, secure digital (SD) storage devices, and memory stick storage devices. Examples of mobile devices 28, 30, 32 may include, but are not limited to, data-enabled cellular telephone 28, personal digital assistant 30, Internet-enabled multimedia mobile telephone 32, as well as various dedicated network devices (not shown), for example. Using client applications 22, 24, 26, users 40, 42, 44 may consume data services (e.g., send/receive data, access the internet, etc.). Consuming data services may include accessing server application 20.

Users 40, 42, 44 may query server computer 12 for location-oriented information, for example. Location-oriented data provision process 10 may respond to the users' queries with the requested information over network 14, 18, as will be discussed in more detail below. Server computer 12 may provide the requested information from information stored on storage device 16. Additionally/alternatively, location-oriented data provision process 10 may query a third party server computer, e.g., third party server computer 46, via network 14 for the requested location-oriented information. For example, third party server computer 46 may execute third party database server application 48, e.g., which may include relationship-oriented and/or location-oriented information and may be queried by location-oriented data provision process 10.

Third party server computer 46 may execute a web server application, examples of which may include but are not limited to: Microsoft IIS, Novell Webserver, or Apache Webserver, that allows for HTTP (i.e., HyperText Transfer Protocol) access to/by server computer 12 via network 14. Third party database server application 48 may reside on third party server computer 46. The instruction sets and subroutines of third party database server application 48, which may be stored on storage device 50 coupled to third party server computer 46, may be executed by one or more processors (not shown) and one or more memory architectures (not shown) incorporated into third party server computer 46. Storage device 50 may include but is not limited to: a hard disk drive; a tape drive; an optical drive; a RAID array; a random access memory (RAM); and a read-only memory (ROM). Third party database server application 48 may be configured to manage relationship-oriented and/or location-oriented information for a plurality of users.

Users 40, 42, 44 may access server application 20 directly through the device on which the client application (e.g., client applications 22, 24, 26) is executed, namely mobile devices 28, 30, 32, for example. Users 40, 42, 44 may access server application 20 through network 14 or through secondary network 18. Further, server computer 12 (i.e., the computer that executes server application 20) may be connected to network 14 through secondary network 18, as illustrated with phantom link line 52.

The various client electronic devices and server computers may be directly or indirectly coupled to network 14 (or network 18). For example, server computers 12, 48 are shown directly coupled to network 14 via a hardwired network connection. Data-enabled cellular telephone 28 is shown wirelessly coupled to network 14 via wireless communication channel 54 established between data-enabled cellular telephone 28 and wireless access point (i.e., WAP) 56, which is shown directly coupled to network 14. WAPs 56 may be, for example, an IEEE 802.11a, 802.11b, 802.11g, Wi-Fi, and/or Bluetooth device that is capable of establishing wireless communication channel 54 between data-enabled cellular telephone 28 and WAP 56. Internet-enabled multimedia mobile telephone 32 is shown wirelessly coupled to network 18 via wireless communication channel 58 established between Internet-enabled multimedia mobile telephone 32 and cellular network/bridge 60, which is shown directly coupled to network 18. Similarly, personal digital assistant 30 is shown wirelessly coupled to network 14 via wireless communication channel 62 established between personal digital assistant 30 and cellular network/bridge 64, which is shown directly coupled to network 14. Other connectivity schemes may also be equally utilized.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Mobile devices 28, 30, 32 may each execute an operating system, examples of which may include but are not limited to Microsoft Windows, Microsoft Windows CE®, Redhat Linux, or a custom operating system. (Windows CE is a registered trademark of Microsoft Corporation in the United States, other countries, or both).

Figure 2:
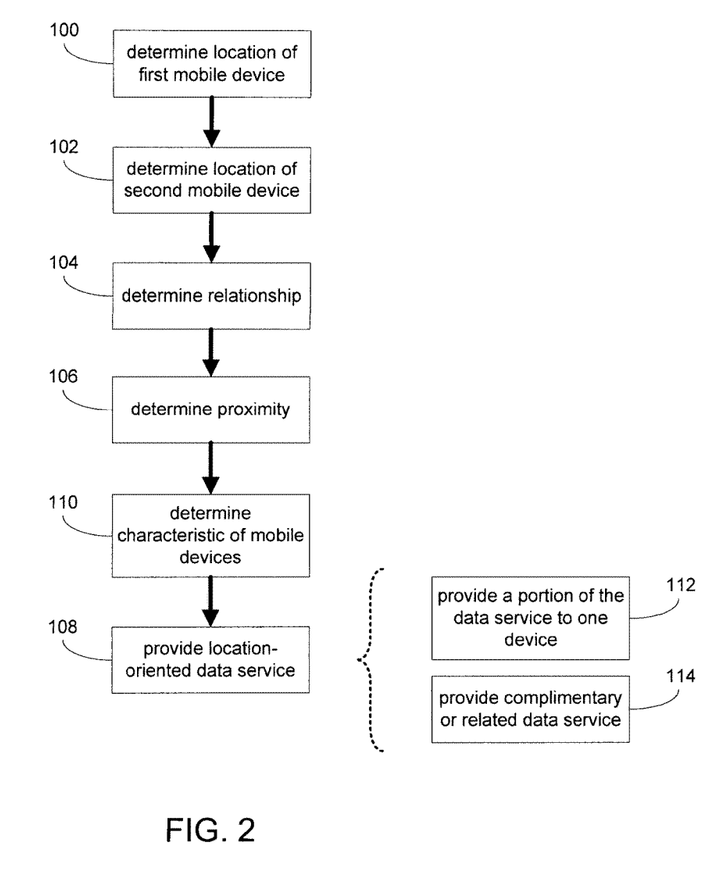
FIG. 2 is a flowchart of a process executed by the location-oriented data provision process of FIG. 1.

Referring also to FIG. 2, a method for providing location-based data services (e.g., which may be executed by location-oriented data provision process 10) may generally include determining a location of a first mobile device (at process block 100) associated with a first user, and determining a location of a second mobile device (at process block 102) associated with a second user. As discussed above, the first and the second mobile devices may include, for example, cellular telephones, personal digital assistants, smart-phones, and the like. A relationship between the first user and the second user may be determined (at process block 104). The method may further include determining a proximity of the first mobile device relative to the second mobile device (at process block 106), and providing a location-oriented data service (at process block 108) to at least one of the first mobile device and the second mobile device.

The location-oriented data service may include any data service that is based upon, at least in part, the location of one, or both, of the first mobile device and the second mobile device. For example, the location-oriented data service may include a location based advertisement, such as an advertisement for a business (e.g., a restaurant or a retail establishment), point of interest, or attraction that is geographically proximate to the determined location of the first and/or second mobile device. In another example, the location-oriented data service may include a response to a request for the location-oriented data service that may be received from the first mobile device. For example, the user of the first mobile device may request, via the first mobile device, a listing of restaurants. The location-oriented data service may include a listing of restaurants, with maps/directions, and associated sample menus. Continuing with the above example, the location-oriented data service may provide the listing of restaurants and maps/directions to the first mobile device and the associated menus to the second mobile device. As such, the first and second users may receive both the restaurant listing/maps and the menus together.

Determining the location of the first and second mobile devices (at process blocks 100 and 102 respectively) may be accomplished through various means, e.g., which may depend upon the functionality of the mobile devices, the type of network the mobile devices are operating on, and the like. Further, different mechanisms may be employed for determining the location of the first mobile device (at process block 100) and determining the location of the second mobile device (at process block 102). For example, one, or both, of the mobile devices may include a global positioning system, which may allow the geographic location of a mobile device to be determined (at process blocks 100 and 102, respectively). Similarly, a proximity to a fixed cell phone access point (such as a cellular telephone transceiver tower) may provide at least some degree of location information. Proximity to more than one fixed cell phone access point may provide a greater degree of location information (e.g., via triangulation or the like). In a related manner, a proximity to a wireless LAN access point (e.g., a wireless router, etc.) may provide location information of the mobile devices. Proximity to more than one wireless LAN access point may, in a similar manner to proximity to a cell phone access point, provide a greater degree of location information. In a similar manner, determining the location of the first and/or second mobile device (at process blocks 100, 102) may be based upon a the mobile device's proximity to one or more Bluetooth microcells. Additionally, the location of the first and/or second mobile device may be determined based upon, at least in part, a user location entry input into one, or both, of the first and second mobile device.

As shown in the flow chart of FIG. 2, the process may include determining a relationship between the first user (e.g., the user of the first mobile device) and the second user (e.g., the user of the second mobile device), at process block 104. Determining a relationship between the first user and the second user (e.g., in process block 104) may include determining whether a relationship exists between the first user and the second user and determining whether no relationship exists between the first user and the second user. Determining whether a relationship exists between the first user and the second user may be based upon, at least in part, membership of the first mobile device and the second mobile device in a common consumer communication plan. Examples of common consumer communication plans may include, but are not limited to, corporate communication plans (e.g., in which a corporate entity may have a block wireless subscription covering multiple mobile devices), domestic common communication plans (e.g., in which more than one wireless subscription may be held by a single family), or the like. If both the first mobile device and the second mobile device are members of such a common consumer communication plan, it may be determined (at process block 104) that a relationship exists between the first and second user.

Similarly, determining a relationship between the first and second users (at process block 104) may be based upon, at least in part, the second user residing in a contacts list of the first user, or vice-versa. An example of a contacts list may include, but is not limited to, a telephone contacts list associated with the first and/or second user, an email contacts list associated with the first and/or second user, an instant messaging buddy list associated with the first and/or second user, or the like. The contacts list associated with the first and/or second user may include a contacts list stored on the first or second mobile device, a contacts list stored remotely from the first or second mobile device which may be accessible, e.g., based upon an identity of the first and/or second user, e.g., as may be discerned from the first and/or second mobile device, respectively.

Furthermore, determining a relationship between the first user and the second user (at process block 104) may be based upon, at least in part, a frequency of communication between the first user and the second user. For example, a lack of prior communication between the first user and the second user may indicate the lack of a relationship between them. Similarly, frequent communication between the first user and the second user may indicate the existence of a relationship between the first user and the second user. Communication between the first user and the second user may be indicated by, for example, a record of communications between the first mobile device and the second mobile device, email communication and/or instant messaging communication between the first user and the second user (e.g., which may be associated with the first mobile device and the second mobile device by, for example, user identity information associated with the first mobile device and the second mobile device, respectively).

As mentioned above, the process may also include determining a proximity between the first mobile device and the second mobile device (at process block 106). The proximity between the first mobile device and the second mobile device may be determined (at process block 106) based upon, at least in part, the location of the first mobile device and the second mobile device, respectively determined at process blocks 100 and 102. Determining the proximity of the first mobile device and the second mobile device may establish if the first user is proximate the second user. For example, the first mobile device may have a determined location of 35 Berkeley Street, Boston, Mass. The second mobile device may similarly have a determined location of 35 Berkeley Street, Boston, Mass. As such, it may be determined (at process block 106) that the first mobile device is proximate to the second mobile device. Conversely, if the second mobile device has a determined location of 50 California Street, San Francisco, Calif., it may be determined (at process block 106) that the first mobile device is not proximate to the second mobile device.

As discussed above, the method may include determining the location of the second mobile device (at process block 102), determining a relationship between the first user and the second user (at process block 104), and determining a proximity between the first mobile device and the second mobile device (at process block 106). However, the sequence of steps depicted in the flow chart of FIG. 2 should not be construed as a limitation of this disclosure. In this regard, the location of the second mobile device may be determined (at process block 102). Upon determining the location of the second mobile device, the process may include determining a relationship (at process block 104) between the first user (e.g., the user of the first mobile device) and the second user. If a relationship is determined to exist between the first user and the second user, the process may include determining a proximity of the first mobile device and the second mobile device (at process block 106). In another embodiment, the process may include determining (at process block 104) users with whom the first user has a relationship. The process may further include determining the location (at process block 102) of mobile device associated with the users with whom the first user has relationships. Further, the process may include determining (at process block 106) the proximity between the mobile device associated with the users with whom the first user has relationships. As such, the process may include determining a proximity (at process block 106) between the first mobile device and the second mobile device based upon, at least in part, a determined relationship (at process block 104) between the first user (associated with the first mobile device) and the second user (associated with the second mobile device). Additionally/alternatively, the process may include determining a relationship (at process block 104) between a first user, associated with a first mobile device, and a second user, associated with a second mobile device, based upon, at least in part, a proximity determined (at process block 106) between the first mobile device and the second mobile device. Additional/alternative sequences of the above discussed steps may equally be utilized.

The process may further include determining a characteristic of at least one of the first mobile device and the second mobile device (at process block 110). The characteristic may include, for example, at least one of an available bandwidth, and availability status, a screen size and a battery life of the first mobile device and/or the second mobile device. The characteristic of the first mobile device and/or the second mobile device may be determined (at process block 110) based upon, at least in part, device information maintained by the mobile service provider, device characteristics provided by the first mobile device and/or the second mobile device, etc. The available bandwidth may include, for example, data connectivity capabilities of the first and second mobile devices (e.g., 2G, 2.5G, 3G data connectivity, i.e., second generation cellular data connectivity, second-and-a-half generation cellular data connectivity, and third generation cellular data connectivity, respectively). The availability status of the first mobile device and the second mobile device may include, for example, a current available quality of service. The screen size of the first mobile device and the second mobile device may relate to the capacity of the first mobile device and the second mobile device to graphically display information.

Providing the location-oriented data service (at process block 108) may include providing (at process block 112) at least a portion of the location-oriented data service to at least one of the first mobile device and the second mobile device based upon, at least in part, the characteristic of the first mobile device and the second mobile device determined at process block 110. For example, it may be determined (at process block 110) that the first mobile device is capable of 2G data connectivity and the second mobile device is capable of 3G data connectivity. It may further be determined that the second mobile device has a larger screen that the first mobile device. In an example in which the location-oriented data service may include a map, the process may include providing (at process block 112) the map (i.e., the location-oriented data service) to the second mobile device. For example, based upon, at least in part, the greater available bandwidth and the larger screen size, the map may be provided to the second mobile device, e.g., which may be capable of more quickly downloading the map, and may be capable of better displaying the map.

The process may also include providing (at process block 114) at least one of a complementary and a related location-oriented data service to the other of the first mobile device and the second mobile device. Continuing with the above-stated example, the location-oriented data service may be a map. The map may be provided (at process block 112) to the second mobile device (e.g., based upon one or more characteristic of the first mobile device and the second mobile device). Complimentary location-oriented data service (e.g., a listing of points of interest in the area of the map) may be provided (at process block 114) to the first mobile device. Various additional/alternative complementary and/or related location-oriented data services may be provided (at process block 114) to the other of the first and the second mobile device, depending, for example, upon the nature of location-oriented data service provided at process block 112.

By way of illustration, a first user (e.g., user 40) may request map directions to P.F. Changs China Bistro at 800 Boylston Street, Boston, Mass., using a first mobile device (e.g., client application 22 executed on mobile device 28). In response to the requested map directions, location-oriented data provision process 10 may determine the location of mobile device 28 to be at 10 St. James Avenue, Boston, Mass. For example, location-oriented data provision process 10 may determine the location of mobile device 28 utilizing a global positioning system (e.g., which may be incorporated into mobile device 28), proximity to a fixed cell phone access point, proximity to a wireless LAN access point, proximity to a Bluetooth microcell, or via a location entry input into mobile device 28, e.g., via client application 22.

Location-oriented data provision process 10 may further determine a location of a second mobile device (e.g., mobile device 32 associated with user 44) based upon, at least in part, a determined relationship between user 40 and user 44. The relationship between user 40 and user 44 may be determined, for example, based upon user 40 and user 44 each having a membership in a common consumer communication plan. Additionally/alternatively, location-oriented data provision process 10 may determine the relationship between user 40 and user 44 based upon, at least in part, a contacts list of user 40 or a frequency of communication between user 40 and user 44 (e.g., which may be determined based upon a call log stored by mobile device 28 and/or mobile communication records). Information relating to enrollment in common consumer communication plans, contacts lists, call logs, etc., may be stored in third party database server application 48, e.g., which may be queried by location oriented data provision process 10. Location-oriented data provision process 10 may further determine a proximity between mobile device 28 and mobile device 32 (e.g., by comparing a determined location of mobile device 28 and of mobile device 32). For example, location-oriented data provision process 10 may determine that mobile device 32 is also located at 10 St. James Avenue, Boston, Mass.

Further, location-oriented data provision process 10 may determine one or more characteristics of mobile device 28 and mobile device 32. For example, location-oriented data provision process 10 may determine (e.g., based upon device specifications, that mobile device 28 is capable of 2G cellular data communication and has a 2.3 inch display screen. Similarly, location-oriented data provision process 10 may determine that mobile device 32 is capable of 3G cellular data communication and has a 3.5 inch display screen. Various additional and/or alternative characteristics of mobile devices 28, 32 may similarly be determined.

Having determined that mobile device 32 is capable of greater data bandwidth and includes a larger display screen, location-oriented data provision process 10 may provide at least a portion of the map directions to P.F. Changs to mobile device 32 (e.g., which may be capable of more quickly downloading the map directions and may provide a larger display screen for viewing the map directions). Additionally, location-oriented data provision process 10 may provide a complementary and/or a related location-oriented data service to mobile device 28. For example, location-oriented data provision process 10 may provide a menu for P.F. Changs China Bistro to mobile device 28.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer-implemented method, comprising:
determining a first screen size of a first mobile device associated with a first user;
determining a second screen size of the second mobile associated with a second user;
providing a first portion of a location-oriented data service to the first mobile device; and
providing a second portion of the location-oriented data service to the second mobile device based upon an interrelationship between the first user and the second user, wherein
the first screen size is different than the second screen size,
first content within the first portion is based upon the first screen size,
second content within the second portion is based upon the second screen size,
the first content differs from the second content based upon the first screen size being different than the second screen size,
the first content is provided to the first mobile device at substantially a same time as when the second content is provided to the second mobile device, and
the first content is complementary to and based upon the second content.

2. The method of claim 1, wherein
the interrelationship is based upon a proximity of a location of the first mobile device to a location of the second mobile device.

3. The method of claim 2, wherein
the interrelationship is further based upon at least one of:
a membership in a common consumer communication plan,
a contacts list of the first user, and
a frequency of communication with the first user.

4. The method of claim 1, wherein
the first content differs from the second content further based upon at least one of:
an available bandwidth for each of the first and second mobile devices, and
a remaining battery life for each of the first and second mobile devices.

5. The method of claim 1, wherein
the first portion is different from the second portion.

6. The method of claim 1, wherein
the location-oriented data service is a response to a request received from the first mobile device.

7. A computer hardware system, comprising:
a hardware processor configured to initiate the following operations:
determining a first screen size of a first mobile device associated with a first user;
determining a second screen size of the second mobile associated with a second user;
providing a first portion of a location-oriented data service to the first mobile device; and providing a second portion of the location-oriented data service to the second mobile device based upon an interrelationship between the first user and the second user, wherein
the first screen size is different than the second screen size,
first content within the first portion is based upon the first screen size,
second content within the second portion is based upon the second screen size,
the first content differs from the second content based upon the first screen size being different than the second screen size, the first content is provided to the first mobile device at substantially a same time as when the second content is provided to the second mobile device, and the first content is complementary to and based upon the second content.

8. The system of claim 7, wherein the interrelationship is based upon a proximity of a location of the first mobile device to a location of the second mobile device.

9. The system of claim 8, wherein the interrelationship is further based upon at least one of:
 a membership in a common consumer communication plan,
 a contacts list of the first user, and
 a frequency of communication with the first user.

10. The system of claim 7, wherein the first content differs from the second content further based upon at least one of:
 an available bandwidth for each of the first and second mobile devices, and
 a remaining battery life for each of the first and second mobile devices.

11. The system of claim 7, wherein the first portion is different from the second portion.

12. The system of claim 7, wherein the location-oriented data service is a response to a request received from the first mobile device.

13. A computer program product, comprising:

a hardware storage device having stored therein a plurality computer instructions, which when executed by a computer hardware system, cause the computer hardware system to perform:
 determining a first screen size of a first mobile device associated with a first user;
 determining a second screen size of the second mobile associated with a second user;
 providing a first portion of a location-oriented data service to the first mobile device; and
 providing a second portion of the location-oriented data service to the second mobile device based upon an interrelationship between the first user and the second user, wherein the first screen size is different than the second screen size, first content within the first portion is based upon the first screen size, second content within the second portion is based upon the second screen size, the first content differs from the second content based upon the first screen size being different than the second screen size, the first content is provided to the first mobile device at substantially a same time as when the second content is provided to the second mobile device, and the first content is complementary to and based upon the second content.

14. The computer program product of claim 13, wherein the interrelationship is based upon a proximity of a location of the first mobile device to a location of the second mobile device.

15. The computer program product of claim 14, wherein the interrelationship is further based upon at least one of:
 a membership in a common consumer communication plan,
 a contacts list of the first user, and
 a frequency of communication with the first user.

16. The computer program product of claim 13, wherein the first content differs from the second content further based upon at least one of:
 an available bandwidth for each of the first and second mobile devices, and
 a remaining battery life for each of the first and second mobile devices.

17. The computer program product of claim 13, wherein the first portion is different from the second portion.

18. The computer program product of claim 13, wherein the location-oriented data service is a response to a request received from the first mobile device.

\* \* \* \* \*